United States Patent Office 2,977,191
Patented Mar. 28, 1961

2,977,191
ANHYDROUS COLORLESS PHOSPHATES

Fernand Pottiez, Ostend, Belgium, assignor to Union Chimique Belge, S.A., Brussels, Belgium, a corporation of Belgium No Drawing. Filed Mar. 14, 1958, Ser. No. 721,335
Claims priority, application Belgium Mar. 19, 1957
6 Claims. (Cl. 23—107)

It is known that phosphoric acid extracted from phosphate rocks is generally yellow or green. Orthophosphates prepared from crude phosphoric acid have also a yellowish coloration. This coloration is particularly strong in the case of salts which contain a high percentage of $P_2O_5$ such as pyrophosphates, metaphosphates and polyphosphates. It is very difficult to obtain quite white salts using technical phosphoric acid as starting material. However, hydrated polyphosphates are not so much colored as anhydrous polyphosphates.

Several processes have been proposed to improve the coloration of anhydrous alkali metal phosphates. A treatment of phosphoric acid with oxidizing agents such as hydrogen peroxide, solutions of chlorates or hypochlorites gives bad results. It is the same when bleaching agents such as charcoal, silica gel, kieselguhr are used. Recrystallization and calcination of salts obtained after neutralization do not improve the appearance of the products. However, recrystallization requires a previous dissolution which induces a partially retrogradation in orthophosphates.

Investigations have shown that the specific coloration of anhydrous polyphosphates is due to the presence of vanadium. It is generally accepted that the vanadium of the phosphate rocks remains quantitatively in the phosphoric acid, either as vanadic acid $H_3VO_4$, or as vanadium phosphates $VO(H_2PO_4)_2$ or $VO_2(H_2PO_4)$.

One object of the present invention is to prepare colorless alkali metal phosphates by removing vanadium from phosphoric acid.

It has been observed that vanadium may be removed as an insoluble phosphorus complex in the presence of a reducing agent; this complex is not formed when vanadium is in its maximum oxidizing state.

According to the present invention, a reducing compound is added to a phosphoric acid solution obtained from phosphate rocks. The vanadium is so reduced to its tri- or tetravalent state. This addition is generally carried out at the beginning of the neutralization of the acid. It is also possible to add the reducing agent after a partial introduction of the alkali metal carbonate or hydroxide. This addition may also be made during the preparation of the phosphoric acid.

All reducing agents are not suitable in the process of the invention. Experience has shown that a reducing agent, whose oxido-reduction potential is less than +0.5 volt, is necessary to reduce vanadium in its tri- or tetravalent state.

Some of the reducing agents whose oxido-reduction potential is less than +0.5 volt, are not suitable as they are not practical (hydrogen sulfide) or as they induce secondary reactions (organic acids, alcohols, nitrites). Excellent results have been obtained using anhydrous or crystalline ferrous sulfate ($FeSO_4$ or $FeSO_4.7H_2O$). The quantity of sulfate which may be used varies between 0.6 and 0.9 kg. of $FeSO_4.7H_2O$ for 100 kg. of 100% phosphoric acid ($H_3PO_4$).

Another object of this invention is to use sodium sulfide or sulfite to remove vanadium from phosphoric acid. A still further object is to use metallic iron or zinc. In this last case the reduction is slower than with dissolved salts which react instantly.

The oxido-reduction potential has been determined in a phosphoric acid solution containing 300 g. of $P_2O_5$ per liter because industrial acids have generally this percentage of $P_2O_5$. Of course the process of the invention may be used whatever the $P_2O_5$ percentage may be.

Example 1

9 kg. of hydrated ferrous sulfate ($FeSO_4.7H_2O$) is dissolved in a mixture of 70 liters of water and 30 liters of 29° Bé. phosphoric acid. This solution is introduced in a tank containing 3 cubic meters of 29° Bé. phosphoric acid. Thereafter is added a quantity of sodium carbonate sufficient to form a mixture whose composition is $1NaH_2PO_4+2Na_2HPO_4$. The insoluble phosphates are filtrated. The obtained solution is evaporated and the residue is dehydrated according to known means. Finally, a quite white sodium tripolyphosphate ($Na_5P_3O_{10}$) is obtained.

Example 2

The process is carried out as in Example 1, but 12 kg. of sodium sulfide are used instead of 9 kg. of ferrous sulfate. The obtained tripolyphosphate is quite white.

Example 3

35 kg. of hydrated sodium sulfite ($Na_2SO_3.7H_2O$) is dissolved in 100 liters of water. This solution is introduced in a tank containing 4 cubic meters of 29° Bé. phosphoric acid. Thereafter is added a quantity of sodium carbonate sufficient to form after the neutralization an equimolar mixture of mono- and disodium phosphates. The process is completed as in Example 1. Finally a quite white polyphosphate ($Na_6P_4O_{13}$) is obtained.

Example 4

In a tank containing 3 cubic meters of 29° Bé. phosphoric acid is added gradually 8 kg. of 1 mm. thick sheet zinc. Heating is carried out at about 40° C. After 12 hours the evolution of hydrogen is ended. The process is completed according to Example 1.

The same results are obtained using 8 kg. of divided iron instead of zinc.

I claim:

1. A process for preparing anhydrous colorless alkali metal phosphate, which comprises reacting a solution of crude phosphoric acid which is contaminated with impurities containing colored vanadium compounds, in the presence of a neutralizing agent selected from the group consisting of alkali metal carbonate and alkali metal hydroxide, with a reducing agent having a reduction-oxidation potential below +0.5 volt and being selected from the group consisting of hydrogen, sodium sulfite, sodium sulfide and ferrous sulfate, so as to form an insoluble vanadium-phosphates-containing product in said solution, separating the insoluble product from the resulting liquid phase, and dehydrating the latter to obtain anhydrous colorless alkali metal phosphate.

2. A process for preparing anhydrous colorless alkali metal phosphates which comprises adding to a solution of phosphoric acid contaminated with impurities containing colored vanadium compounds, metallic iron and a neutralizing agent selected from the group consisting of alkali metal carbonate and alkali metal hydroxide, filtering the resulting insoluble vanadium-containing phosphate precipitate, evaporating the filtrate and dehydrating the residue therefrom, and recovering the resulting anhydrous colorless alkali metal phosphates.

3. A process for preparing anhydrous colorless alkali metal phosphates which comprises adding to a solution of phosphoric acid contaminated with impurities containing colored vanadium compounds, metallic zinc and a neutralizing agent selected from the group consisting of alkali metal carbonate and alkali metal hydroxide, filtering the resulting insoluble vanadium-containing phosphate precipitate formed, evaporating the filtrate and dehydrating the residue therefrom, and recovering the resulting anhydrous colorless alkali metal phosphates.

4. A process for preparing anhydrous colorless alkali metal phosphates which comprises adding to a solution of phosphoric acid contaminated with impurities containing colored vanadium compounds, sodium sulfite and a neutralizing agent selected from the group consisting of alkali metal carbonate and alkali metal hydroxide, filtering the resulting insoluble vanadium-containing phosphate precipitate formed, evaporating the filtrate and dehydrating the residue therefrom, and recovering the resulting anhydrous colorless alkali metal phosphates.

5. A process for preparing anhydrous colorless alkali metal phosphates which comprises adding to a solution of phosphoric acid which is contaminated with impurities containing colored vanadium compounds, ferrous sulfate and a neutralizing agent selected from the group consisting of alkali metal carbonate and alkali metal hydroxide, filtering the resulting insoluble vanadium-containing phosphate precipitate formed, evaporating the filtrate and dehydrating the residue therefrom, and recovering the resulting anhydrous colorless alkali metal phosphates.

6. A process for preparing anhydrous colorless alkali metal phosphates which comprises adding to a solution of phosphoric acid contaminated with impurities containing colored vanadium compounds, sodium sulfide and a neutralizing agent selected from the group consisting of alkali metal carbonate and alkali metal hydroxide, filtering the resulting insoluble vanadium-containing phosphate precipitate formed, evaporating the filtrate and dehydrating the residue therefrom, and recovering the resulting anhydrous colorless alkali metal phosphates.

References Cited in the file of this patent
UNITED STATES PATENTS

| | | |
|---|---|---|
| 1,654,404 | Blumenberg | Dec. 27, 1927 |
| 2,419,148 | King | Apr. 15, 1947 |
| 2,493,809 | Garrison | Jan. 10, 1950 |
| 2,601,395 | Hatch | June 24, 1952 |
| 2,749,214 | Eickhoff et al. | June 5, 1956 |

OTHER REFERENCES

Titanium, Barksdale, Ronald Press Co., 1949, Chap. X, pages 141–144.